(12) United States Patent
Tang et al.

(10) Patent No.: US 9,045,703 B2
(45) Date of Patent: Jun. 2, 2015

(54) METHOD AND APPARATUS FOR PYROLYSIS AND GASIFICATION OF BIOMASS

(71) Applicant: Sunshine Kaidi New Energy Group Co., Ltd., Wuhan (CN)

(72) Inventors: Hongming Tang, Wuhan (CN); Yanfeng Zhang, Wuhan (CN); Yilong Chen, Wuhan (CN)

(73) Assignee: Sunshine Kaidi New Energy Group Co., Ltd., Wuhun (CN)

( * ) Notice: Subject to any disclaimer, the term of this patent is extended or adjusted under 35 U.S.C. 154(b) by 0 days.

(21) Appl. No.: 13/745,861

(22) Filed: Jan. 20, 2013

(65) Prior Publication Data

US 2013/0125465 A1    May 23, 2013

Related U.S. Application Data

(63) Continuation-in-part of application No. PCT/CN2011/076917, filed on Jul. 6, 2011.

(30) Foreign Application Priority Data

Jul. 20, 2010    (CN) .......................... 2010 1 0234122

(51) Int. Cl.
| | |
|---|---|
| C10J 3/46 | (2006.01) |
| C10J 1/207 | (2012.01) |
| B01J 7/00 | (2006.01) |
| C10J 3/12 | (2006.01) |
| C10J 3/20 | (2006.01) |
| C10J 3/48 | (2006.01) |
| C10J 3/66 | (2006.01) |
| C10J 3/72 | (2006.01) |
| C10J 3/84 | (2006.01) |

(52) U.S. Cl.
CPC ..... *C10J 3/46* (2013.01); *C10J 3/12* (2013.01); *C10J 3/20* (2013.01); *C10J 3/48* (2013.01); *C10J 3/66* (2013.01); *C10J 3/72* (2013.01); *C10J 3/84* (2013.01); *C10J 2300/0993* (2013.01); *C10J 3/721* (2013.01); *C10J 2300/0916* (2013.01); *C10J 2300/093* (2013.01); *C10J 2300/094* (2013.01)

(58) Field of Classification Search
USPC ............... 48/61, 127.9, 127.1, 197 R, 76–78, 48/198.3, 203, 207
See application file for complete search history.

(56) References Cited

U.S. PATENT DOCUMENTS

| | | | | |
|---|---|---|---|---|
| 4,264,435 A | * | 4/1981 | Read et al. ..................... | 208/129 |
| 4,364,745 A | * | 12/1982 | Weil ............................... | 48/209 |

(Continued)

*Primary Examiner* — Kaity Handal
(74) *Attorney, Agent, or Firm* — Matthias Scholl P.C.; Scholl, Matthias

(57) ABSTRACT

A method for pyrolysis and gasification of biomass by: a) providing a gasifier and a pyrolysis furnace; heating and introducing a solid particle, or a plurality thereof, into the gasifier and the pyrolysis furnace; b) grinding and feeding the biomass into the pyrolysis furnace while spraying saturated water vapor into the pyrolysis furnace, contacting the biomass with the saturated water vapor at 500-800° C. to yield crude synthetic gas and ash including coke; c) separating the ash, heating the solid particle, and transporting the solid particle into the gasifier; d) cooling the ash, and separating the coke; and e) introducing the crude synthetic gas into the gasifier, transporting the coke into the gasifier while spraying saturated water vapor into the gasifier, contacting the coke and the crude synthetic gas with the saturated water vapor at 1200-1600° C.

9 Claims, 1 Drawing Sheet

(56) References Cited

U.S. PATENT DOCUMENTS

| | | | |
|---|---|---|---|
| 5,034,021 A * | 7/1991 | Richardson | 48/77 |
| 7,214,252 B1 * | 5/2007 | Krumm et al. | 48/198.2 |
| 2002/0069798 A1 * | 6/2002 | Aguadas Ellis | 110/229 |
| 2003/0140559 A1 * | 7/2003 | Krumm et al. | 48/77 |
| 2004/0182003 A1 * | 9/2004 | Bayle et al. | 48/210 |
| 2008/0244976 A1 * | 10/2008 | Paisley | 48/62 R |
| 2009/0133328 A1 * | 5/2009 | Van Den Berg et al. | 48/87 |
| 2010/0095592 A1 * | 4/2010 | Huber | 48/62 R |
| 2010/0270505 A1 * | 10/2010 | Gallaspy et al. | 252/373 |
| 2013/0125463 A1 * | 5/2013 | Chen et al. | 48/119 |
| 2013/0125464 A1 * | 5/2013 | Chen et al. | 48/119 |

* cited by examiner

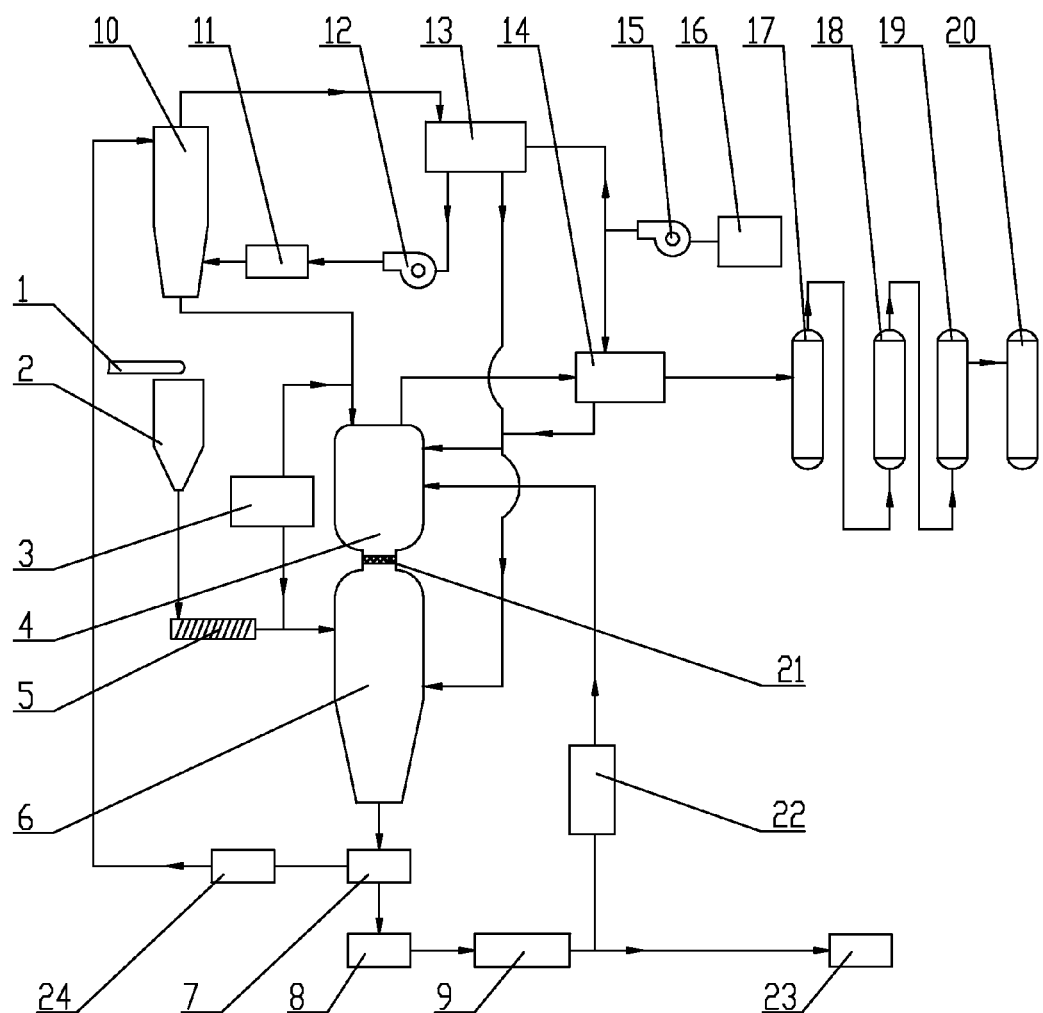

METHOD AND APPARATUS FOR PYROLYSIS AND GASIFICATION OF BIOMASS

CROSS-REFERENCE TO RELATED APPLICATIONS

This application is a continuation-in-part of International Patent Application No. PCT/CN2011/076917 with an international filing date of Jul. 6, 2011, designating the United States, now pending, and further claims priority benefits to Chinese Patent Application No. 201010234122.9 filed Jul. 20, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a technology for transforming combustible materials into clean and highly efficient synthetic gas, and more particularly to a method and a system for pyrolysis and gasification of biomass using two interconnected furnaces.

2. Description of the Related Art

A typical biomass gasification technology includes: fixed bed gasification, fluidized bed gasification, and two stages gasification, all of which are direct gasification technologies. The processes of direct gasification technologies are characterized in that the heat produced by part of the biomass supplies energy resource for gasification, the air, oxygenized air, or a combination of the oxygenized air and water vapor is functioned as an oxidant during the gasification reaction. However, studies have shown that technologies of direct gasification of the biomass are disadvantageous in the following aspects:

First, the components and the heat value of the biomass fuels are unstable, the biomass has low fire point and fast combustible reaction, thus, explosion easily occurs. When part of regions are superheated and coked, the operating temperature of the gasifier is very difficult to control.

Second, when the air works as an oxidant in which the content of the inactive gas of $N_2$ is prominent, it results in a higher content of $N_2$, a lower content of effective gas ($CO+H_2$), and a lower ratio of $H_2/CO$, besides, the heat value of the synthetic gas is low and unstable, which only maintains at 5000 KJ/Nm$^3$ below and hardly meets the need of the later industrial utilization.

Third, when the oxygenized air works as an oxidant, although the content of $N_2$ is relatively lowered, an additional air separating device is necessitated. Because of a large capacity and high energy consumption of the air separating device, such a process largely increases the production cost.

Fourth, when the oxygenized air and the water vapor work as both oxidants, although the content of $N_2$ in the synthetic gas is lowered, and the content of $H_2$ is increased, the water vapor working as a reacting medium still consumes a large amount of heat energy, plus the energy consumption in the air separation, the process largely maximizes the production cost.

Fifth, about 15-20% of the biomass is necessitated to self-ignite for providing the energy resource for gasification, but at the same time a large amount of $CO_2$ is produced in the combustion, correspondingly, the content of effective gas ($CO+H_2$) is lowered. Furthermore, the high temperature synthetic gas and the mixed air carry a large amount of sensible heat, and thus, the conversion of the heat energy into the chemical energy is largely minimized, and the efficiency of the cooled gas is also lowered, which is generally 70% below and no higher than 80% in exceptional conditions.

Sixth, the operating temperature of the gasifier is generally controlled at 800-1200° C., at such a temperature, the gasification of the biomass produces a large amount of tar which is difficult to remove, and too much of tar aggregated in the device and pipes is apt to cause pipe blocking and device contamination.

Seventh, the gash produced in the gasification of the biomass contains a prominent content of alkali metal oxides comprising K and Na, which is general 20-40 wt. % of the total ash. However, at a temperature higher than 800° C., the alkali metal oxides is apt to be gasified and mixed into the synthetic gas, which not only affects the property of the synthetic gas, but also adheres to the pipes and devices together with the tar, thereby resulting a serious corrosion on the devices and pipes.

In view of the above existing problems, technologies of direct gasification of biomass are difficult to be applied in practical production. Thus, a method for gasifying the biomass which can be applied in industrial production and converted to commercial benefits is desired.

SUMMARY OF THE INVENTION

In view of the above-described problems, it is one objective of the invention to provide a method and a system for pyrolysis and gasification of biomass. The method features easy control, energy saving, and low cost. The produced synthetic gas has a high efficiency and high heat value, with absence of tar or alkali metal dioxides.

To achieve the above objective, there is provided a method for pyrolysis and gasification of biomass. The method employs a solid particle having a high thermal capacity as an energy carrier and a saturated water vapor as an oxidant. The pyrolysis and gasifiction of the biomass are conducted in a pyrolysis furnace and a gasifier, respectively, and thus clean synthetic gas is obtained. The method comprises the following steps:

a) Providing a gasifier comprising an inner cavity and a pyrolysis furnace comprising an inner cavity, interconnecting the inner cavity of the gasifier and the inner cavity of the pyrolysis furnace from the top down, and introducing the solid particle from an upper end of the gasifier into the gasifier and the pyrolysis furnace in sequence. Heat energy of the solid particle is supplied by an external heating device, for example, a plasma torch heater, and generally, the solid particle is heated to a temperature of 1400-1800° C. In the gasifier, the solid particle releases one part of the heat energy to maintain the inner cavity of the gasifier at an operating temperature of 1200-1600° C.; when falling down to the pyrolysis furnace, the solid particle releases another part of the heat energy to maintain the inner cavity of the pyrolysis furnace at an operating temperature of 500-800° C. Thus, self-ignition of the biomass is not necessitated in the pyrolysis and the gasification, and a conversion of the biomass is highly improved.

b) Grinding the biomass, feeding the biomass into the pyrolysis furnace while spraying the saturated water vapor into the pyrolysis furnace, contacting the biomass with the saturated water vapor for pyrolyzing the biomass into crude synthetic gas and ash comprising a coke. Because the operating temperature of the pyrolysis furnace is below sublimation points of alkali metal oxides comprising K and Na, the alkali metal oxides exist in the ash comprising the coke, and the crude synthetic gas comprises no tar or minor tar.

c) Separating the ash comprising the coke from the solid particle, reheating the solid particle, and transporting the solid particle into the gasifier for a next circulation. The heated solid particle supplies heat energy for the biomass pyrolysis and gasification but do not participated in any chemical reactions, so that the circulation of the solid particle lowers the energy consumption as well as the production cost.

d) Cooling down the ash comprising the coke generally to a temperature of 150° C. below, and separating the coke from the ash. The coke is used for producing synthetic gas in a following step, and the ash comprising the alkali metal oxides are transported to an ash storehouse for comprehensive utilization.

e) Introducing the crude synthetic gas into the gasifier via the interconnected inner cavities, transporting the coke into the gasifier while spraying the saturated water vapor into the gasifier, contacting the coke and the crude synthetic gas with the saturated water vapor for gasifying the coke and the crude synthetic gas into primary synthetic gas. Because the operating temperature of the gasifier is above a temperature to form tar, the crude synthetic gas and the coke are fully gasified, and the acquired primary synthetic gas comprises no tar.

f) Cooling, removing dust, deacidifying, and desiccating the primary synthetic gas to transform the primary synthetic gas into clean synthetic gas. The process of cooling not only is a necessity in the whole process for production of synthetic gas, but also recovers a large amount of sensible heat for comprehensive utilization. The process of dust removal separates the dust from the crude synthetic gas, and lowers the dust concentration of the gas to 50 mg/Nm$^3$ below. Harmful ingredients, like $H_2S$, COS, HCL, $NH_3$, and HCN, are removed from the synthetic gas in the deacidification process. After desiccation, the primary synthetic gas is transformed into the clean synthetic gas, which is stored for latter industrial application.

In a class of this embodiment, the solid particle is a rare earth particle, ceramic particle, or quartz sand; and a diameter of the solid particle is less than 5 mm The solid particle has stable physical and chemical properties even at a temperature of 1400-1800° C., high enthalpy value, the temperature of the solid particle is easy to control when being heated, and thus, the solid particle is very suitable to work as an energy carrier. Meanwhile, a relatively small particle size ensures a larger total surface area, compared with the same number of the solid particle; the small size is not only conducive to transmission of heat from the solid particle to the biomass, but also helpful to form a flowing filter layer at the intersection between the pyrolysis furnace and the gasifier, so that the dust in the crude synthetic gas is removed.

In a class of this embodiment, a nitrogen protecting device is connected to a feed inlet of the pyrolysis furnace and a particle inlet of the gasifier, in case of fire and explosion caused by leakage of the crude synthetic gas from the pyrolysis furnace.

In a class of this embodiment, an operating temperature of the pyrolysis furnace is controlled at 500-650° C., an operating pressure of the pyrolysis furnace is controlled at 105-109 kPa. An input speed of the saturated water vapor into the pyrolysis furnace is 35-50 m/s; a retention time of the crude synthetic gas in the pyrolysis furnace is 15-20 s, and an output speed of the crude synthetic gas from the pyrolysis furnace is 15-20 m/s. The pyrolysis furnace operates at a normal pressure, and no special pressure device is needed, thereby lowering the production cost. The biomass in the pyrolysis furnace is fast desiccated, separated from volatile matters, and pyrolyzed during the contact with the crude synthetic gas and the saturated water vapor. Furthermore, the operating temperature of the pyrolysis furnace is much lower than sublimation points of the alkali metal oxides, which are about 800° C., so that the alkali metal oxides are removed from the crude synthetic gas. The relatively low output speed from the pyrolysis furnace prevents the ash from aggregating in the outlet of the pyrolysis furnace and the gas pips.

In a class of this embodiment, an operating temperature of the gasifier is controlled at 1200-1400° C., and a preferable operating pressure of the gasifier is controlled at 105-109 kPa. An input speed of the saturated water vapor into the gasifier is 35-50 m/s; a retention time of the primary synthetic gas in the gasifier is 15-20 s, and an output speed of the primary synthetic gas from the gasifier is 15-20 m/s. The gasifier operates at a normal pressure, and no special pressure device is needed, thereby lowering the production cost. A high input speed of the saturated water vapor into the gasifier largely improves the contact and mix of the crude synthetic gas and the coke. The operating temperature range of the gasifier is suitable and ensures a total gasification of the crude synthetic gas and the coke during the contact with the saturated water vapor, the acquired primary synthetic gas comprises no tar; at the same time the energy consumption is lowered as much as possible, and the performance of the gasifier is largely improved.

In a class of this embodiment, the primary synthetic gas is cooled down to a temperature of 260-320° C., and then cleaning processes is conducted. As the temperature of the primary synthetic gas output from the gasifier is still high, about 1200-1400° C., the cooling process is not only conducive to the later dust removal, deacidification, and desiccation, but also helpful to recover the sensible heat in the primary synthetic gas, thereby achieving a comprehensive utilization of the waste heat.

A system for pyrolysis and gasification of biomass according to the above method, comprises: the pyrolysis furnace, the gasifier; a particle heater; a plasma torch heater; an exhaust blower; a first heat exchanger; a water storage tank; a water pump; and a second heat exchanger. The gasifier is disposed on the pyrolysis furnace, and the inner cavity of the gasifier and the inner cavity of the pyrolysis furnace are interconnected vertically.

The water storage tank is connected to a water inlet of the first heat exchanger and a water inlet of the second heat exchanger via the water pump; both a vapor outlet of the first heat exchanger and a vapor outlet of the second heat exchanger are connected to both a vapor nozzle of the pyrolysis furnace and a vapor nozzle of the gasifier. An air outlet of the first heat exchanger is connected to an air inlet of the plasma torch heater via the exhaust blower, an air outlet of the plasma torch heater is connected to an air inlet of the particle heater, and an air outlet of the particle heater is connected to an air inlet of the first heat exchanger.

In a class of this embodiment, a feed outlet of the particle heater is connected to a particle inlet of the gasifier; a gas outlet of the gasifier is connected to a gas inlet of the second heat exchanger; a gas outlet of the second heat exchanger is connected to a dust collector, a deacidification tower, and a desiccator in sequence. An ash outlet of the pyrolysis furnace is connected to a feed inlet of a particle separator; an ash outlet of the particle separator is connected to an ash inlet of an ash cooler; and an ash outlet of the ash cooler is connected to a feed inlet of an ash-coke separator.

As the plasma torch heater is advantageous in ultra-high temperature heat, fast transfer of heat and mass, high efficiency, and adjustable heat power; it can instantly heat the circulated air to a temperature of 1800-2000° C. Then the high temperature circulated air is used to heat the solid particle, thereafter, solid particle at the required temperature is output to the pyrolysis furnace and the gasifier for maintaining stable operating temperatures. The first heat exchanger and the second heat exchanger effectively recover a large amount of the sensible heat of circulated air and the primary synthetic gas, respectively. The water in the water storage tank is preheated and transformed into the saturated water vapor due to the sensible heat, thus, the energy consumption of the plasma torch heater is lowered, and comprehensive utilization of heat energy is achieved.

In a class of this embodiment, a nitrogen protecting device is connected to both a feed inlet of the pyrolysis furnace and the particle inlet of the gasifier. When the biomass is input into the feed inlet of the pyrolysis furnace, the nitrogen protecting device supplies nitrogen to the pyrolysis furnace via the feed inlet; and when the solid particle is input into the gasifier, the nitrogen protecting device supplies nitrogen to the gasifier via the particle inlet, so that nitrogen sealing layers are formed, which prevent the synthetic gas from leaking out of the pyrolysis furnace and the gasifier, and keep the air outside the pyrolysis furnace and the gasifier, the fire and explosion are eliminated and the property of the synthetic gas is assured.

In a class of this embodiment, the vapor nozzles arranged on the pyrolysis furnace and the gasifier are grouped into 2-4 height levels, respectively, and the vapor nozzles of each level are evenly and tangentially arranged along a circumferential direction. Thus, the saturated water vapor is sprayed into the pyrolysis furnace and the gasifier from different levels, and an even and stable temperature filed is maintained at different height levels, resulting in a fully contact between the saturated water vapor and the reactants.

In a class of this embodiment, an intersection of the inner cavity of the pyrolysis furnace and the inner cavity of the gasifier is bottle necked, and at least one layer of a mesh screen is disposed at the intersection. The minimized cross area at the bottle necked intersection and the arrangement of the mesh screen can effectively control the descending speed of the high temperature solid particle; the solid particle fully releases the heat energy in the gasifier and then fall into the pyrolysis furnace, so that stable operating temperatures of the gasifier and the pyrolysis furnace are achieved. At the same time, the solid particle blocked by the mesh screen forms a flowing filter layer, which is helpful to remove the dust in the ascending crude synthetic gas.

In a class of this embodiment, a coke outlet of the ash-coke separator is connected to a coke inlet of the gasifier via a coke transporter. A particle outlet of the particle separator is connected to a feed inlet of the particle heater via a particle transporter. For example, a screw feeder is employed to directly transport the coke to the gasifier, and a pneumatic transporting pipe is used to transport the solid particle to the particle heater, so that the intermediate manual transportation is saved, which improves the stability and the succession of the whole system.

Based on the inherent characteristics of the water, ash, volatile matters, and ash fusion point of the biomass, and combined with the operating features of the gasifier, the method of the invention employs the saturated water vapor, rather than the conventional oxidant air or oxygenized air, as an oxidant, and the solid particle having a high thermal capacity as an energy carrier to produce a synthetic gas from biomass by low temperature pyrolysis and high temperature gasification.

Advantages of the invention are summarized hereinbelow:
First, the solid particle is used to heat the biomass indirectly, and the saturated water vapor works as an oxidant in the biomass pyrolysis and gasified at different temperatures. Not only are the energy carrier and the oxidant independent of each other, applicable to different kinds of biomass, and convenient in operation; but also is the air or the oxygenized air not necessitated as an oxidant any more, thereby minimizing the energy consumption in the whole process and the total production cost.

Second, no self-ignition occurs in the biomass during the pyrolysis and the gasification, thereby effectively solving the problems in conventional gasify process, such as fuel explosion in the pyrolysis furnace or the gasifier, regional cokings, and difficulties in controlling each stage. Because the air or the oxygenized air is not necessary in the reaction anymore, the synthetic gas has a high ratio of $H_2/CO$, and a high content of the effective gas ($CO+H_2$), which is 85% above, thus, the heat value of the synthetic gas is largely improved, and the use of the synthetic gas is much wider.

Third, the main reaction devices are the pyrolysis furnace and the gasifier, both of which are interconnected, so that the structure is simplified. The biomass is at first pyrolyzed into the crude synthetic gas and the coke at a low temperature; the crude synthetic gas flows up into the gasifier, the coke is transported into the gasifier, and both the crude synthetic gas and the coke are gasified at a high temperature. Since the temperature ranges are suitably set, the produced crude synthetic gas comprises no alkali metal oxides; the tar and coke are all transformed into the primary synthetic gas; thus, the carbon conversion is very high, the acquired primary synthetic gas is absent of impurities that are dirty and corrosive to the devices and pipes, and the later cleaning process becomes much simpler.

Fourth, the plasma torch heater heats up the solid particle by employing a circulated air as a medium, the high temperature solid particle supplies all the heat energy which is necessary for biomass pyrolysis and gasification. The heat energy of the biomass fuel is all transformed into a chemical energy, and the efficiency of the cooled gas is 88% above, which is 8% higher than that of the conventional.

Fifth, the plasma torch heater has a high heat efficiency, and adjustable input power. When the components of the biomass fuel changes, the power of the plasma torch heater can be adjusted, so that it is very convenient to control the temperature of the saturated water vapor, maintain the gasifier work stably, and assure a stable output of the primary synthetic gas and a stable property.

The method and the system of the invention is applicable to different kinds of biomass fuels, and is especially applicable in industries of the integrated biomass gasification cycle combination and the biomass liquid fuel.

BRIEF DESCRIPTION OF THE DRAWINGS

The invention is described hereinbelow with reference to accompanying drawings, in which the sole FIGURE is a structure diagram of a system for pyrolysis and gasification of biomass.

DETAILED DESCRIPTION OF THE EMBODIMENTS

For further illustrating the invention, experiments detailing a method and a system for pyrolysis and gasification of biomass are described below. It should be noted that the following examples are intended to describe and not to limit the invention As shown in FIG. 1, a system for pyrolysis and gasification of biomass, comprises: a belt conveyer 1; a hopper 2; a screw feeder 5 for transporting the biomass; a pyrolysis furnace 6 and a gasifier 4 functioning as main reactors, the gasifier 4 being disposed on the pyrolysis furnace 6, and an inner cavity of the pyrolysis furnace 6 and an inner cavity of the gasifier 4 being interconnected vertically; a particle heater 10, a plasma torch heater 11, an exhaust blower 12, and a first heat exchanger 13 being connected one by one to form a circulation for heating solid particle and a saturated water vapor successively; a water storage tank 16, a water pump 15, and a second heat exchanger 14 for cooling down primary synthetic gas and producing the saturated water vapor; a dust collector 17, a deacidification tower 18, and a desiccators 19 for a latter cleaning of the synthetic gas.

An output end of the belt conveyer 1 is arranged above an inlet of the hopper 2, an outlet of the hopper 2 is connected to a feed inlet of the screw feeder 5, and a feed outlet of the screw feeder 3 is connected to a feed inlet of the pyrolysis furnace 6.

The gasifier 4 is disposed on the pyrolysis furnace 6; the inner cavity of the gasifier 4 and the inner cavity of the pyrolysis furnace 6 are interconnected. An intersection of the inner cavity of the pyrolysis furnace 6 and the inner cavity of the gasifier 4 is bottle necked. The intersection is a gas outlet of the pyrolysis furnace 6 as well as a gas inlet of the gasifier 4. At least one layer of a mesh screen is disposed at the intersection for lowering and controlling the descending speed of the solid particle. The pyrolysis furnace 6 and the gasifier 4 comprise a casing comprising a water cooled jacket or an air cooled jacket, and has effective thermal insulation.

The feed inlet of the pyrolysis furnace 6 is arranged on an upper part; to assure an even biomass addition and a stable flow field inside the pyrolysis furnace 6, the number of the feed inlet is two to four. The pyrolysis furnace 6 comprises an ash outlet arranged at a bottom; the number of the ash outlet is one or two. Ash discharged from the ash outlet of the pyrolysis furnace 6 is in a liquid state. The ash outlet is connected to an ash inlet of a particle separator 7 for separating the solid particle from the ash. An ash outlet of the particle separator 7 is connected to an ash inlet of an ash cooler 8 for cooling the ash comprising a coke. An ash outlet of the ash cooler 8 is connected to a feed inlet of an ash-coke separator 9 for separating the coke from the ash.

Preferably, a particle outlet of the particle separator 7 is connected to a feed inlet of the particle heater 10 via a particle transporter 24. A coke outlet of the ash-coke separator 9 is connected to a coke inlet of the gasifier 4 via a coke transporter 22. Compared with the manual transportation, the method of the invention is energy saving and assures a stable and continuous operation of the gasifier 4.

The coke inlet of the gasifier 4 is arranged on an upper part or an upper end. To assure an even coke addition and a stable flow field inside the gasifier 4, the number of the coke inlet is one or two in compliance with the capacity. A gas outlet of the gasifier 4 is arranged on the upper part and connected to a gas inlet of the second heat exchanger 11, a gas outlet of the second heat exchanger 11 is connected to the dust collector 17, the deacidification tower 18, and the desiccator 19 in sequence, and an outlet of the desiccator 19 is connected to a gas storage tank 20.

As an improvement, a nitrogen protecting device 3 is connected to the feed inlet of the pyrolysis furnace 6 and the particle inlet of the gasifier 4, so that a nitrogen sealing layer is formed for effectively separating the synthetic gas from the air.

The saturated water vapors sprayed into the pyrolysis furnace 6 and the gasifier 4 is transformed from a soft water or a desalted water in the water storage tank 16 after heat exchanging with the circulated air and the primary synthetic gas in the first heat exchanger 13 and the second heat exchanger 14, respectively. The water storage tank 16 is connected to a water inlet of the first heat exchanger 13 and a water inlet of the second heat exchanger 14 via the water pump 15. Both a vapor outlet of the first heat exchanger 13 and a vapor outlet of the second heat exchanger 14 are connected to both a vapor nozzle of the pyrolysis furnace 6 and a vapor nozzle of the gasifier 4. As an improved structure, the vapor nozzles arranged on the pyrolysis furnace 6 and the gasifier 4 are grouped into 2-4 height levels, respectively, and the vapor nozzles of each level are evenly and tangentially arranged along a circumferential direction. Thus, an even and stable vapor filed is maintained, and a fully contact between the saturated water vapor and the reactants is achieved.

The solid particle is heated indirectly by the plasma torch heater 11 via an intermediate process of heating the circulated air. An air outlet of the first heat exchanger 13 is connected to an air inlet of the plasma torch heater 11 via the exhaust blower 12, an air outlet of the plasma torch heater 11 is connected to an air inlet of the particle heater 10, an air outlet of the particle heater 11 is connected to an air inlet of the first heat exchanger 13. A feed outlet of the particle heater 10 is connected to a particle inlet of the gasifier 4 for supplying a stable heat energy resource to the biomass.

The system also comprises the ash storehouse 23. The ash output from the ash-coke separator 9 is transported to the ash storehouse 23 by manual or mechanical mode.

A method for pyrolysis and gasification of biomass using the above system is specifically described as follows:

A) Start the exhaust blower 12 and the plasma torch heater 11, gradually heat the circulated air to a temperature of 1800-2000° C. The circulated air exchanges heat with the solid particle in the particle heater 10. After the heat exchange, the solid particle is heated to a temperature of 1400-1800° C.; the circulated air is cooled down to a temperature of 500-650° C. and transported to the first heat exchanger 13 for utilization of waste heat. The high temperature solid particle is transported to the particle inlet of the gasifier 4, and fall down to the gasifier 4 and the pyrolysis furnace 6 in sequence due to the gravity. The temperature and the flow rate of the solid particle are adjusted until an operating temperature of the gasifier 4 is 1200-1400° C. and an operating temperature of the pyrolysis furnace 6 is 500-650° C.

B) Ground biomass is transported to the pyrolysis furnace 6 via the belt conveyer 1, the hopper 2, and the screw feeder 5 in turn, at the same time nitrogen is input from the nitrogen protecting device 3 to both the feed inlet of the pyrolysis furnace 6 and the particle inlet of the gasifier 4. When the biomass is a gray straw, for example, twigs and roots of trees, a particle size of the biomass is controlled at 50 mm×50 mm below, and a water content of the biomass is controlled at 40% below. When the biomass is yellow straw, such as stalks of threshed grain, thatch, stalks of corns, the particle size of the biomass can be relatively large.

C) The desalted water is output from the water storage tank 16 to both the water inlet of the first heat exchanger 13 and the water inlet of the second heat exchanger 14 via the water pump 16. In the first heat exchanger 13, the desalted water extracts a waste heat of the circulated air, and the circulated air is cooled down from the temperature of 500-650° C. to 200° C. below; at the same time 0.4-0.6 Mpa of a saturated water vapor is produced. The cooled air is then transported to the plasma torch heater 11 for reheating. In the second heat exchanger 14, the desalted water extracts a sensible heat of the primary synthetic gas which is cooled down to a temperature of 260-320° C., and at the same time 0.4-0.6 Mpa of a saturated water vapor is produced. Saturated water vapors from the vapor outlet of the first heat exchanger 13 and the vapor outlet of the second heat exchanger 14 are introduced to both the vapor nozzles of the pyrolysis furnace 6 and the vapor nozzles of the gasifier 4.

D) The saturated water vapor is input into the pyrolysis furnace 6 at a speed of 35-50 m/s; operating parameters of the pyrolysis furnace 6 are: 500-650° C. of the temperature, and 105-109 kPa of a pressure; so that the biomass is fully contacted with the saturated water vapor and pyrolyzed into the crude synthetic gas and the ash comprising the coke. The crude synthetic gas is maintained in the pyrolysis furnace 6 for 15-20 s, and output from the pyrolysis furnace 6 is at a speed of 15-20 m/s.

E) The ash comprising the coke is at the temperature of 500-650° C. and is mixed with the solid particle, after being transported from the ash outlet of the pyrolysis furnace 6 into the particle separator 7, the solid particle is separated from the ash. The solid particle returns to the particle heater 10 via the particle transporter 24 for a next circulation. The ash comprising the coke is transported to the ash cooler 8, after a heat recovery, the temperature of the ash comprising the ash is cooled down to 150° C. below. The coke is separated from the ash by the ash-coke separator 9 and then transported into the gasifier 9 via the coke transporter 22, while the ash from the ash-coke separator 9 is transported to the ash storehouse 23 by a manual or mechanical mode.

F) The crude synthetic gas at the temperature of 500-650° C. crosses the mesh screen 21 at the bottle necked intersection and flows up into the gasifier 4, at the same time the saturated water vapor is input into the gasifier 4 at a speed of 35-50 m/s; the gasifier 4 is controlled at the operating temperature of 1200-1400° C. and an operating pressure of 105-109 kPa, so that the crude synthetic gas and the coke is fully contacted with the saturated water vapor to gasify into the primary synthetic gas. The primary synthetic gas is maintained in the gasifier 4 for 15-20 s, and output from the gasifier 4 at a speed of 15-20 m/s.

G) The primary synthetic gas at the temperature of 1200-1400° C. is transported from the gasifier 4 to the gas inlet of the second heat exchanger 14 via the pipe. After being cooled down to the temperature of 260-320° C. by the desalted water, the primary synthetic gas is output from the gas outlet of the second heat exchanger 14 to the dust collector 17. Dust in the primary synthetic gas is arrested in the dust collector 17, and a dust concentration of the primary synthetic gas at the outlet of the dust collector 17 is 50 mg/Nm$^3$ below.

H) After dust removal, the primary synthetic gas is transported to the deacidification tower 18, in which harmful ingredients like $H_2S$, COS, HCL, $NH_3$, and HCN are removed.

I) After deacidification, the primary synthetic gas is transported into the desiccator 19, in which the water is removed, and the clean synthetic gas is acquired. The clean synthetic gas is transported into the gas storage tank 20 and is stored for later industrial application.

After many times of tests and data detections, main components and characteristics thereof of the clean synthetic gas are shown in Table 1.

TABLE 1

Main components and characteristics of clean synthetic gas

| Number | Component | Unit | Value |
|---|---|---|---|
| 1 | CO | % (vol.) | 30-40 |
| 2 | $H_2$ | % (vol.) | 40-50 |
| 3 | $N_2$ + Ar | % (vol.) | <1.0 |
| 4 | $CO_2$ | % (vol.) | 15-20 |
| 5 | $CH_2$ | % (vol.) | 5-6 |
| 6 | $C_nH_m$ | % (vol.) | <2 |
| 7 | Heat value of a synthetic gas (LHV) | MJ/Nm$^3$ | 12.5-13.4 |
| 8 | Efficiency of a cooled gas | % | ~87.0 |

As shown in Table 1, the clean synthetic gas produced by the method comprises 90% of a total content of (CO+$H_2$), a ratio of $H_2$/CO is equal to or larger than 1, a heat value of the synthetic gas is 12.5-13.4 MJ/Nm$^3$, and an efficiency of the cooled gas is about 87%. Thus, the synthetic gas can bring great commercial benefits, and is especially applicable in industries of the integrated biomass gasification cycle combination and the biomass liquid fuel.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for pyrolysis and gasification of biomass, the method comprising the following steps:
    a) providing a device comprising a gasifier, a mesh screen, and a pyrolysis furnace, said gasifier comprising a first inner cavity and an upper end, said pyrolysis furnace comprising a second inner cavity, said gasifier being directly connected to said pyrolysis furnace, said first inner cavity being interconnected to said second inner cavity, said mesh screen being disposed between said first inner cavity and said second inner cavity;
    b) heating solid particles to a temperature of 1400-1800° C.;
    c) introducing said solid particles into said gasifier from said upper end to allow said solid particles to fall down through said gasifier, said mesh screen, and said pyrolysis furnace in sequence for heating said first inner cavity of said gasifier to a temperature of 1200-1600° C. and heating said second inner cavity of said pyrolysis furnace to a temperature of 500-800° C.; said mesh screen reducing the flow rate of said solid particles;
    d) grinding said biomass, feeding said biomass into said pyrolysis furnace while spraying saturated water vapor into said pyrolysis furnace, contacting said biomass with said saturated water vapor at 500-800° C. for pyrolyzing said biomass to yield crude synthetic gas and ash comprising coke, whereby said ash is mixed with said solid particles;

e) separating said ash from said solid particles, heating said solid particles, and transporting said solid particles into said gasifier in c);

f) cooling down said ash, and separating said coke from said ash;

g) introducing said crude synthetic gas into said gasifier, transporting said coke into said gasifier while spraying saturated water vapor into said gasifier, contacting said coke and said crude synthetic gas with said saturated water vapor at 1200-1600° C. for gasifying said coke and said crude synthetic gas to yield primary synthetic gas; and h) cooling said primary synthetic gas, removing dust from said primary synthetic gas, deacidifying said primary synthetic gas, and desiccating said primary synthetic gas to yield clean synthetic gas.

2. The method of claim 1, wherein said solid particles are rare earth particles, ceramic particles, or quartz sand, and a diameter of said solid particles is less than 5 mm.

3. The method of claim 2, wherein in step a) a nitrogen atmosphere is provided at feed inlets of said pyrolysis furnace and said gasifier.

4. The method of claim 3, wherein
said operating temperature of said pyrolysis furnace is controlled at 500-650° C., an operating pressure of said pyrolysis furnace is controlled at 105-109 kPa;
an input speed of said saturated water vapor into said pyrolysis furnace is 35-50 m/s; and
a retention time of said crude synthetic gas in said pyrolysis furnace is 15-20 s, and an output speed of said crude synthetic gas from said pyrolysis furnace is 15-20 m/s.

5. The method of claim 3, wherein
said operating temperature of said gasifier is controlled at 1200-1400° C., and an operating pressure of said gasifier is controlled at 105-109 kPa;
an input speed of said saturated water vapor into said gasifier is 35-50 m/s; and
a retention time of said primary synthetic gas in said gasifier is 15-20 s, and an output speed of said primary synthetic gas from said gasifier is 15-20 m/s.

6. The method of claim 3, wherein said primary synthetic gas is cooled down to a temperature of 260-320° C., and then separated from dust, deacidified, and desiccated.

7. The method of claim 1, wherein
said operating temperature of said pyrolysis furnace is controlled at 500-650° C., an operating pressure of said pyrolysis furnace is controlled at 105-109 kPa;
an input speed of said saturated water vapor into said pyrolysis furnace is 35-50 m/s; and
a retention time of said crude synthetic gas in said pyrolysis furnace is 15-20 s, and an output speed of said crude synthetic gas from said pyrolysis furnace is 15-20 m/s.

8. The method of claim 1, wherein
said operating temperature of said gasifier is controlled at 1200-1400° C., and an operating pressure of said gasifier is controlled at 105-109 kPa;
an input speed of said saturated water vapor into said gasifier is 35-50 m/s; and
a retention time of said primary synthetic gas in said gasifier is 15-20 s, and an output speed of said primary synthetic gas from said gasifier is 15-20 m/s.

9. The method of claim 1, wherein said primary synthetic gas is cooled down to a temperature of 260-320° C., and then separated from dust, deacidified, and desiccated.

* * * * *